US008951312B2

(12) United States Patent
Stern

(10) Patent No.: US 8,951,312 B2
(45) Date of Patent: Feb. 10, 2015

(54) COMPACT, SAFE AND PORTABLE HYDROGEN GENERATION APPARATUS FOR HYDROGEN ON-DEMAND APPLICATIONS

(76) Inventor: Alvin Gabriel Stern, Newton, MA (US)

(*) Notice: Subject to any disclaimer, the term of this patent is extended or adjusted under 35 U.S.C. 154(b) by 763 days.

(21) Appl. No.: 13/373,258

(22) Filed: Nov. 9, 2011

(65) Prior Publication Data
US 2013/0115139 A1    May 9, 2013

(51) Int. Cl.
*B01J 7/00* (2006.01)
*C01B 3/02* (2006.01)
*C01B 3/08* (2006.01)
*C25C 1/02* (2006.01)
*B01J 7/02* (2006.01)

(52) U.S. Cl.
CPC ... *C25C 1/02* (2013.01); *B01J 7/02* (2013.01); *C01B 3/08* (2013.01); *Y02E 60/36* (2013.01)
USPC ............... 48/61; 423/652; 423/650; 423/651; 423/648.1; 423/657; 48/127.1; 48/127.9

(58) Field of Classification Search
USPC ............. 48/61, 127.1, 127.9; 423/648.1, 650, 423/651, 652, 657
See application file for complete search history.

(56) References Cited

U.S. PATENT DOCUMENTS

| 2,408,748 | A | * | 10/1946 | Alexander | 423/646 |
|---|---|---|---|---|---|
| 2,660,517 | A | * | 11/1953 | Padgitt | 423/641 |
| 5,371,617 | A | * | 12/1994 | Mitsutake et al. | 349/8 |
| 5,514,353 | A | * | 5/1996 | Adlhart | 422/239 |
| 5,817,157 | A | * | 10/1998 | Checketts | 48/61 |
| 6,818,334 | B2 | * | 11/2004 | Tsang | 429/421 |
| 6,936,081 | B2 | * | 8/2005 | Rusta-Sallehy et al. | 48/118.5 |
| 6,939,529 | B2 | * | 9/2005 | Strizki et al. | 423/658.2 |
| 6,946,104 | B2 | * | 9/2005 | Rusta-Sallehy et al. | 422/198 |
| 7,083,657 | B2 | * | 8/2006 | Mohring et al. | 48/61 |
| 7,306,780 | B1 | * | 12/2007 | Kravitz et al. | 423/648.1 |
| 7,344,571 | B2 | * | 3/2008 | Bae et al. | 48/61 |
| 7,393,369 | B2 | * | 7/2008 | Shurtleff | 48/61 |
| 7,438,732 | B2 | * | 10/2008 | Shurtleff et al. | 48/61 |
| 7,481,858 | B2 | * | 1/2009 | Rosenzweig et al. | 48/76 |
| 7,513,978 | B2 | * | 4/2009 | Petillo | 204/230.5 |
| 7,530,931 | B2 | * | 5/2009 | Amendola et al. | 482/61 |
| 7,594,939 | B2 | * | 9/2009 | Goldstein et al. | 48/61 |
| 7,641,889 | B1 | * | 1/2010 | Salinas et al. | 423/658.2 |
| 7,727,293 | B2 | * | 6/2010 | Rosenzweig et al. | 48/61 |
| 7,803,349 | B1 | * | 9/2010 | Muradov | 423/657 |
| 7,858,068 | B2 | * | 12/2010 | Fuller et al. | 423/648.1 |
| 7,951,349 | B2 | * | 5/2011 | Kindler et al. | 423/416 |

(Continued)

*Primary Examiner* — Kaity Handal

(57) ABSTRACT

A compact, chemical-mechanical apparatus, having no electrical components, for storing and generating hydrogen safely, on-demand, at the time and point of use in small or large quantities using the environmentally clean chemical reaction between sodium metal and water to generate hydrogen ($H_2$) gas and sodium hydroxide (NaOH) byproduct is presented, for powering electricity generating fuel cells for large scale commercial and private electric motor vehicle transport. The apparatus of the present invention supports hydrogen gas generation by the controlled addition of liquid water to solid sodium metal to produce hydrogen gas and sodium hydroxide using only mechanical components without electrical components that require external power and can generate sparks or short circuits, producing catastrophic failure in hydrogen systems. The sodium hydroxide can be reclaimed and recycled by electrolysis using hydroelectric power to recover the sodium metal for reuse in generating hydrogen, thereby forming a complete clean energy hydrogen power cycle.

9 Claims, 2 Drawing Sheets

(56) References Cited

U.S. PATENT DOCUMENTS

| | | |
|---|---|---|
| 8,529,867 B2 * | 9/2013 | Fullerton ................ 423/657 |
| 2004/0131541 A1 * | 7/2004 | Andersen ................ 423/657 |
| 2007/0194273 A1 * | 8/2007 | Zhao et al. ............ 252/182.12 |
| 2009/0202413 A1 * | 8/2009 | Saxena ................ 423/277 |
| 2010/0061923 A1 * | 3/2010 | Reddy ................ 423/600 |
| 2011/0094894 A1 * | 4/2011 | Mason ................ 205/637 |
| 2011/0104048 A1 * | 5/2011 | Maury ................ 423/657 |

* cited by examiner

COMPACT, SAFE AND PORTABLE HYDROGEN GENERATION APPARATUS FOR HYDROGEN ON-DEMAND APPLICATIONS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Hydrogen has many applications in scientific research and in industry, although its greatest potential application as an energy source for electricity generating fuel cells used for powering electric motor vehicle transport, has yet to be realized. Hydrogen gas can be safely transported, handled and distributed in gaseous form when stored in high pressure compressed gas cylinders, for scientific research and industrial applications, however, such methods of hydrogen ($H_2$) gas storage in high pressure cylinders or even cryogenic storage of liquid hydrogen, are considered too dangerous for widespread use in commercial and private motor vehicles. Hydrogen gas is extremely flammable and the small size of hydrogen molecules makes it very difficult to contain in a confined space, since the small molecules can leak around the threads of fittings and pressure regulators and even diffuse directly through materials that are ordinarily not permeable to other, larger gas molecules. Compressed hydrogen gas storage systems must therefore be constantly checked for leaks, rendering them costly and ultimately not sufficiently safe for widespread use in commercial and private motor vehicles. In essence, one has only to recall the Hindenburg air ship disaster from 1936, for confirmation of the dangers of gaseous hydrogen in passenger transport applications. The ideal hydrogen storage system would therefore allow hydrogen ($H_2$) gas to be generated directly at the time and point of use from less volatile and less flammable precursor substances, when it is ready to be consumed by the fuel cell, so as to minimize the existing quantity of hydrogen ($H_2$) gas stored in the power generation system at any given time, thereby also minimizing the chances for hydrogen leaks and the attendant risks of fire and explosion.

Others have proposed using metal hydride compounds for storing hydrogen such as Titanium hydride (TiH) or Nickel hydride (NiH) compounds where the powdered metals are capable of absorbing large volumes of hydrogen ($H_2$) gas and releasing them by heating the metal hydride on-demand when the hydrogen is required in a gaseous form for consumption in a fuel cell or in another application. The approach of using metal hydrides for hydrogen storage, although safer than storing hydrogen in gaseous or liquid form, is too costly for widespread use in commercial and private motor vehicles since transition metals normally used for such metal hydride hydrogen storage, are expensive. Moreover, the requirement of having to heat the metal hydride to release hydrogen gas, assuming chemical catalysts are not used for the purpose instead, entails most probably the use of an electric heater thereby, increasing the probability of electrical system malfunctions that may lead to arcs and sparking, that in turn can easily lead to catastrophic consequences in the context of hydrogen generation systems.

An alternative method for generating hydrogen ($H_2$) gas on-demand at the time and point of use, in large or small quantities, can be implemented safely using the well-known chemical reaction between sodium (Na) metal and ordinary water ($H_2O$). Most everyone remembers from their first year chemistry course when a small piece of sodium is added to a beaker full with water, the sodium (Na) metal floats on the surface, while racing and sizzling on the surface of the water as a result of being less dense than water and due to hydrogen ($H_2$) gas being generated as it reacts with the water, respectively. The reaction between sodium metal and water produces hydrogen gas and sodium hydroxide according to the chemical equation: $2Na+2H_2O \rightarrow 2NaOH+H_2$. None of the precursor chemicals, including sodium (Na) metal or water ($H_2O$) or the product chemicals, hydrogen ($H_2$) gas and sodium hydroxide (NaOH) are toxic, or excessively dangerous, or costly, therefore, this method of generating hydrogen can be applied safely to generate hydrogen gas for fuel cells to power commercial and private electric motor vehicle transport. Moreover, the product of the hydrogen generating chemical reaction between sodium (Na) metal and water ($H_2O$) namely, sodium hydroxide (NaOH) can be recovered and recycled using chemical electrolysis at an appropriate plant designed for the task, in order to recover the sodium (Na) metal in an environmentally clean process that yields zero pollution and allows the recovered sodium metal to be used for repeat hydrogen generation by reacting with water. The process of chemical electrolysis of NaOH requires electrical energy to chemically separate sodium (Na) metal from sodium hydroxide (NaOH) according to the reaction: $2NaOH+2e^- \rightarrow 2Na+H_2O+1/2O_2$. The products of electrolysis of sodium hydroxide (NaOH) yield the recovered sodium (Na) metal, water ($H_2O$) and oxygen ($O_2$), the latter two substances forming natural constituents of the atmosphere and considered to be non-polluting. The electrical energy for large scale reprocessing of NaOH via the electrolytic process, can be obtained from large hydroelectric or nuclear power plants.

The present invention describes a compact chemical-mechanical apparatus, having no electrical or electromechanical components, that enables hydrogen ($H_2$) gas to be generated safely, on-demand, at the time and point of use in small or large quantities using the fundamentally understood chemical reaction between sodium (Na) metal and water ($H_2O$) that liberates hydrogen ($H_2$) gas from water and produces sodium hydroxide (NaOH) byproduct in an exothermic reaction. Although the chemical reaction phenomenon between sodium metal and water has been known to scientists and engineers, the apparatus by which this chemical reaction can be safely and reliably harnessed or implemented for generating hydrogen ($H_2$) gas on-demand at the time and point of use in large or small quantities using a low cost chemical-mechanical apparatus, having no electrical or electromechanical components that is safe for widespread commercial and private motor vehicle transport by the public, is non-trivial and forms the topic of this invention. The hydrogen generating apparatus of the present invention is strictly implemented using mechanical components without any electrical machinery or electronics that require external sources of electrical energy or power. Such electrical energy sources if present in a hydrogen generating apparatus, would increase the probability of malfunction, and in turn, could easily lead to catastrophic consequences especially in the context of hydrogen storage and generation systems.

The principle based upon which the hydrogen generator of the present invention is implemented requires water ($H_2O$) in a liquid state to be added to sodium (Na) metal, the latter being present in a solid form at room temperature. This approach is preferable to the alternative of adding sodium (Na) metal to water ($H_2O$), since sodium metal is a solid at room temperature and would have to be melted at a temperature of approximately 97.8° C. Sodium metal in its molten form is much more flammable than in its solid form and therefore, should not be melted if possible. If pure sodium metal were to be added to water, it must first be liquefied or melted, the latter requiring some type of electrical heating apparatus, thereby introducing an additional risk of sparks or short circuits, which must be avoided altogether in a hydrogen system where the smallest energy sources could ignite the hydrogen or sodium metal, with possibly fatal consequences. Water, which is already present as a liquid at room temperature and can be maintained as a liquid even below 0° C. by the addition of a solute such as sodium hydroxide (NaOH) or a neutral salt for cold climate use, can be readily transferred from one storage cylinder through a transfer pipe, to a second storage cylinder containing the solid sodium (Na) metal. As soon as the liquid water ($H_2O$) contacts the solid sodium (Na) metal mass, it will react with the sodium metal to produce hydrogen ($H_2$) gas and highly water soluble sodium hydroxide (NaOH) byproduct. Water can be transferred into the sodium containing cylinder until a desired hydrogen pressure is attained above the sodium metal and aqueous sodium hydroxide reaction byproduct, at which point no further water is added to the sodium metal containing cylinder, until the hydrogen pressure in the cylinder is reduced by consumption of the hydrogen ($H_2$) gas above the sodium metal, by the electricity generating fuel cell or other downstream application requiring hydrogen ($H_2$) gas, precursor feedstock. The design of the hydrogen generation apparatus of the present invention, in its preferred embodiment consists of two stainless steel high pressure cylinders. The first stainless steel cylinder has a steel riser tube and stores water ($H_2O$) in a liquid state with an overpressure of inert nitrogen ($N_2$) gas at high pressure above the liquid water that functions to force the water up through the riser tube. The second stainless steel high pressure cylinder contains a monolithic cast block of sodium (Na) metal stored initially under a low pressure inert nitrogen ($N_2$) gas blanket. A mechanical pressure regulator connected to the outlet port of the liquid water containing stainless steel cylinder, senses and maintains the hydrogen ($H_2$) gas overpressure in the sodium (Na) metal containing stainless steel cylinder, by introducing more water into the sodium containing cylinder if the hydrogen ($H_2$) gas pressure in the cylinder drops below the set value of the pressure regulator unit. A second pressure regulator unit, connected to the outlet port of the second stainless steel pressure cylinder controls the downstream pressure of hydrogen ($H_2$) gas provided to the fuel cell or other application. Such hydrogen generating chemical-mechanical apparatus, generates hydrogen continuously at the required consumption rate and pressure, without requiring external intervention in the form of electrical or electronic control signals or other operator functions to be performed, until the sodium (Na) metal has been fully consumed by reacting with water ($H_2O$) to produce hydrogen ($H_2$) gas and sodium hydroxide (NaOH) byproduct.

Although other methods exist for storing hydrogen safely in solid form that are more efficient in terms of the weight of hydrogen stored in the chemical per unit weight and volume of the chemical than sodium (Na) metal, such as for example sodium borohydride ($NaBH_4$), the latter chemical is much more difficult to produce and to recycle from its byproduct sodium borate ($NaBO_2$), resulting from the reaction of water ($H_2O$) and sodium borohydride ($NaBH_4$), in the very large quantities needed for widespread powering of commercial and passenger motor vehicles. By contrast, although sodium (Na) metal produces less hydrogen per unit weight and volume from its reaction with water ($H_2O$) than sodium borohydride ($NaBH_4$), the sodium hydroxide (NaOH) byproduct of the reaction of sodium metal and water can be more easily reprocessed in large scale by electrolysis than sodium borate ($NaBO_2$), to recover the sodium (Na) metal for reuse in generating hydrogen in the large quantities needed to support widespread application of hydrogen powered commercial and private motor vehicles.

As illustrated in U.S. Pat. No. 3,449,078, the method proposed for generating hydrogen relies on conversion of hydrocarbons in the presence of steam with a catalyst comprising rhenium with a small amount of alkali metal that is stable for conversion and supported on a carrier. The described invention for hydrogen generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 5,372,617, the method proposed for generating hydrogen relies on hydrolyzing hydrides at stoichiometry to provide hydrogen on demand to a fuel cell where the hydride exists in a granular form in an insulated pressure vessel into which the water byproduct from the fuel cell is controllably introduced to react with the hydride to generate hydrogen. The rate of water introduction into the hydride containing pressure vessel is determined by the demand for hydrogen at the fuel cell. The described invention for hydrogen generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 5,514,353, the generation of hydrogen in a novel generator configuration is described using the reaction of alkali, alkali-earth metal hydride with water, overcoming the problem associated with the expansion of the hydride upon its conversion to hydroxide or oxide when reacting with water. The hydride cartridge is housed in a reactor to which liquid water is admitted in a controlled mode and as the water enters the reactor and reaches the hydride cartridge, hydrogen is generated. The described invention for hydrogen generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water (H₂O) in a liquid state being added directly to solid sodium (Na) metal in a controlled manner to liberate hydrogen (H₂) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 6,534,033, the method for storing and controlled release of hydrogen is described using borohydride based solutions as a hydrogen storage source and a catalyst system to release hydrogen from the borohydride. The described invention for hydrogen storage and generation however, does not propose a compact chemical-mechanical apparatus having no electrical or electromechanical components, that enables hydrogen (H₂) gas to be generated safely, on-demand, at the time and point of use in small or large quantities using the chemical reaction resulting from water (H₂O) in a liquid state being added directly to solid sodium (Na) metal in a controlled manner to liberate hydrogen (H₂) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 6,818,334, the method for generating hydrogen is described using two liquid solutions that are mixed together in the presence of one or more transition metal catalysts, where the first solution comprises 5 to 50% weight MBH₄ where M is an alkali metal, 5 to 40% weight alkali hydroxide or alkaline metal hydroxide and the balance of water. The second solution comprises 51 to 100% water with the balance if any, being a water soluble additive. The described invention for hydrogen storage and generation however, does not propose a compact chemical-mechanical apparatus having no electrical or electromechanical components, that enables hydrogen (H₂) gas to be generated safely, on-demand, at the time and point of use in small or large quantities using the chemical reaction resulting from water (H₂O) in a liquid state being added directly to solid sodium (Na) metal in a controlled manner to liberate hydrogen (H₂) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 6,936,081, the method and apparatus for generating hydrogen from a hydride solution in the presence of a catalyst is described. The hydrogen generating reactor includes a stack of reactor plates defining reaction chambers alternating with coolant chambers where each reactor plate has a first face defining a solution flow field and an opposing second face defining a coolant flow field and each solution flow field comprises a common reaction chamber and a plurality of channels opening into the common reaction chamber. Each reaction chamber is configured to receive the hydride solution and to bring at least a portion of the hydride solution in contact with the catalyst. The described invention for hydrogen storage and generation however, does not propose a compact chemical-mechanical apparatus having no electrical or electromechanical components, that enables hydrogen (H₂) gas to be generated safely, on-demand, at the time and point of use in small or large quantities using the chemical reaction resulting from water (H₂O) in a liquid state being added directly to solid sodium (Na) metal in a controlled manner to liberate hydrogen (H₂) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 6,939,529, the method for generating hydrogen is described and it self-regulates its own rate of hydrogen generation by monitoring one or more parameters of the hydrogen generation process and then providing relative movement between the fuel tank, containing one or more complex metal hydrides and the catalyst chamber, containing acid or transition metals (Ru, Co, Ni), so as to increase or decrease the rate of hydrogen generation where the catalyst chamber is disposed in a tank containing the fuel. The relative movement provided moves the catalyst chamber toward the fuel solution to increase the rate of hydrogen generation and away from the fuel solution to decrease the hydrogen generation. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 6,946,104, a method for chemical hydride hydrogen generation is provided, comprising a storage tank for storing a chemical hydride solution, a reactor containing a catalyst, a pump for supplying the chemical hydride solution from the storage tank to the reactor so that the chemical hydride solution reacts to generate hydrogen in the presence of the catalyst. A second supply line for continuously supplying the solvent of the solution to the chemical hydride solution during the reaction. The energy system comprises the hydrogen generation system, a fuel cell for generating electricity and water from hydrogen and oxidant, and a separator for recovering the water generated in the fuel cell and feeding it back to the chemical hydride solution during the reaction. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,083,657, a method for hydrogen generation is presented by contacting an aqueous solution of a metal hydride salt with a hydrogen generation catalyst where a recycle line of water condensed from the fluid product to the feed line to be contacted with the catalyst, the internal recycle line permits the use of a more concentrated solution of metal hydride as it is diluted by the recycle line prior to contact with the catalyst. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,306,780, a method for generating hydrogen from sodium borohydride ($NaBH_4$) is presented where the gas is generated by contacting water with micro-disperse particles of sodium borohydride in the presence of a catalyst such as cobalt or ruthenium. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,344,571, a method for generating hydrogen is presented where a housing contains a solid hydrogen source which can be a hydride, within the housing and an inlet configured to guide fluid to contact the solid hydrogen source. The inlet contacts a wicking region which has an affinity for the fluid and the wicking material can include a hydrophilic material. The hydrogen generator includes a hydrogen gas outlet with a gas permeable membrane and the inlet is configured to a fluid control system to control fluid flow rate to the solid hydrogen source forming a portable unit. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,393,369, a method and apparatus for generating hydrogen is presented using a controlled chemical reaction between water and a chemical hydride. The invention includes a chemical hydride isolated from water by a water-selective membrane. A fluid containing water is brought into contact with the water-selective membrane and reacts with the chemical hydride. The described invention for hydrogen storage and generation however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,438,732, a method for implementing a hydrogen generator cartridge is presented where the hydrogen generator system cartridge contains an anhydrous chemical hydride reactant. A plurality of small diameter liquid conduits along the length of the cartridge serve as liquid distribution apertures. The described invention for the hydrogen generator cartridge however, does not propose a compact chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,481,858, a method for implementing hydrogen generating fuel cell cartridges is presented using a reaction chamber having a first reactant, a reservoir having an optional second reactant and a self-regulated flow control device which stops the flow of reactant from the reservoir to the reaction chamber when the pressure of the reaction chamber reaches a predetermined level. The described invention for hydrogen generator cartridge however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,513,978, a method for generating hydrogen based on an electro-galvanic hydrogen generator system is presented that has two or more anode materials including a cathode material and an electrolyte. The electrolyte comprises a metal hydride, at least one stabilizing agent, and a solvent and the hydrogen gas is generated whenever an anode material and the cathode material are electrically connected. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,530,931, a method for generating hydrogen is presented consisting of a fuel container, a spent fuel container, a catalyst system and a control system for generating hydrogen using a hydride solution such as sodium borohydride ($NaBH_4$). The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,594,939, a method for storing and generating hydrogen is presented utilizing a solid chemical hydride fuel selected from the group consisting of sodium borohydride, lithium borohydride, magnesium hydride and calcium hydride where the fuel is encapsulated in a plurality of removable capsules that can be pumped. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,641,889, a method and apparatus for generating hydrogen is presented by applying water to a hydrogen containing composition such as hydride in the presence of a catalyst that promotes hydrolysis to generate hydrogen in a controlled manner. The amount of catalyst present controls the rate of the hydrogen generation passively, or the rate of hydrogen generation is controlled actively by using a lot of catalyst in which case the reaction is controlled by the rate of water addition to the hydride. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,803,349, a method and apparatuses for producing high purity hydrogen from water are provided using chemical compositions. Metals or alloys, preferably aluminum, capable of reacting with water and producing hydrogen in aqueous solutions at ambient conditions are reacted with one or more inorganic hydrides capable of releasing hydrogen in aqueous solutions at ambient conditions, one or more transition metal compounds are used to catalyze the reaction. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,858,068, a method of storing and generating hydrogen for fuel cell applications is presented comprised of a dry, solid-state hydrogen fuel source comprising a solid metal hydride or chemical hydride and a reaction-controlling agent in a solid state, wherein the hydride and the reaction-controlling agent are mixed at a desired proportion, delivering a desired amount of a liquid reactant to contact and react with the solid-state fuel source to produce hydrogen gas continuously or intermittently to the fuel cell. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

As illustrated in U.S. Pat. No. 7,951,349, a method and system for storing and generating hydrogen is described. A metal or metal hydride compound is reacted with high temperature steam in a reaction chamber to yield hydrogen gas ($H_2$) and a metal oxide. The preferred metal is magnesium reacting with steam to produce hydrogen, and the heat generated in the exothermic reaction is used drive the dehydrogenation reaction of a hydrogen containing compound such as a metal hydride. The described invention for hydrogen storage and generation however, does not propose a compact, chemical-mechanical apparatus having no electrical or electromechanical components, that enables hydrogen ($H_2$) gas to be generated safely, on-demand, at the time and point of use in small or large quantities using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

Note that the above methods and apparatus for storing and generating hydrogen gas do not envision, nor describe a compact, chemical-mechanical apparatus having no electrical or electromechanical components, that enables hydrogen ($H_2$) gas to be generated safely, on-demand, at the time and point of use in small or large quantities, using the chemical reaction resulting from water ($H_2O$) in a liquid state being added directly to solid sodium (Na) metal in a controlled manner to liberate hydrogen ($H_2$) gas from the water and produce sodium hydroxide (NaOH) byproduct which can be recycled in an environmentally clean manner by electrolysis to recover the sodium (Na) metal for repackaging and reuse in generating hydrogen.

BRIEF SUMMARY OF THE INVENTION

The challenges associated with realizing a system capable of storing and generating hydrogen gas in a compact, chemical-mechanical apparatus having no electrical or electromechanical components, that enables hydrogen gas to be generated safely, on-demand, at the time and point of use in small or large quantities, using the chemical reaction resulting from water ($H_2O$) in a liquid state being added directly to solid sodium (Na) metal in a controlled manner to liberate hydrogen ($H_2$) gas from the water, with sodium hydroxide (NaOH) as a byproduct which can later be recycled in an environmentally clean manner by electrolysis to recover the sodium (Na) metal for repackaging and reuse in generating hydrogen, can be overcome with the apparatus of the present invention. The hydrogen generating apparatus of the present invention is intended to provide a means for safely delivering hydrogen ($H_2$) gas to fuel cells powering commercial and private electric motor vehicles, at a sufficiently low cost to be suitable for economies of scale. The method by which the apparatus of the present invention stores and delivers hydrogen safely to fuel cells or other applications, relies on the injection or addition of water ($H_2O$) in a liquid state to sodium (Na) metal in a solid state, in a controlled manner, resulting in an exothermic chemical reaction between the liquid water ($H_2O$) and solid sodium (Na) metal, that liberates hydrogen ($H_2$) gas from the water, producing sodium hydroxide (NaOH) as a byproduct, which can later be recycled using electrolysis means, to recover the sodium (Na) metal for repackaging and reuse in generating hydrogen.

Injecting liquid water ($H_2O$) to react with solid sodium (Na) metal to produce hydrogen ($H_2$) and sodium hydroxide (NaOH) byproduct represents the ideal means of storing and generating hydrogen since the two chemical reactants, water ($H_2O$) and sodium metal (Na), as well as the two chemical products hydrogen ($H_2$) and sodium hydroxide (NaOH), are non-toxic and environmentally clean. In addition, the sodium metal which liberates the hydrogen from water by virtue of being more electropositive than the hydrogen, can be recovered by the environmentally clean process of electrolysis of sodium hydroxide, releasing only water ($H_2O$) vapor and oxygen ($O_2$) and no harmful or toxic substances into the environment, thus forming a safe, environmentally clean hydrogen fuel cycle for powering commercial and private electric fuel cell based motor vehicles.

In the preferred embodiment, the design of the hydrogen generation apparatus of the present invention consists of two stainless steel high pressure cylinders. The first stainless steel cylinder consists of a steel riser tube and stores water ($H_2O$) in a liquid state with an overpressure of inert nitrogen ($N_2$) gas at high pressure above the water that functions to force the water up through the riser tube. The second stainless steel high pressure cylinder contains a monolithic cast block of sodium (Na) metal stored initially under a low pressure inert nitrogen ($N_2$) gas blanket. A mechanical pressure regulator unit connected to the outlet port of the water containing stainless steel cylinder, senses and maintains the hydrogen overpressure in the sodium (Na) metal containing stainless steel cylinder, by introducing more water ($H_2O$) into the sodium containing cylinder if the hydrogen ($H_2$) gas pressure in the cylinder drops below the set value of the pressure regulator unit. A second pressure regulator unit, connected to the output port of the second stainless steel pressure cylinder controls the downstream pressure of hydrogen ($H_2$) gas provided to the fuel cell or other application. Such hydrogen generating chemical-mechanical apparatus, generates hydrogen continuously at the required consumption rate and pressure of the downstream application, without requiring external intervention in the form of electrical or electronic control signals or other operator functions to be performed, until the solid sodium (Na) metal has been fully consumed by reacting with water ($H_2O$) to produce hydrogen ($H_2$) gas and sodium hydroxide (NaOH) byproduct.

In summary, the principal advantages of the hydrogen generation method and apparatus of the present invention include first and foremost the safety, environmental cleanliness and cost-effectiveness of the process that surpasses the other existing methods using other types of hydrogen storage and generation methods and apparatus. The method and apparatus of the present invention by virtue of its safety, environmental cleanliness and low cost becomes particularly well suited for large scale application to powering commercial and private motor vehicle transport. The hydrogen generation apparatus of the present invention allows the hydrogen fuel to be generated using the non-toxic and non-hazardous substances of sodium (Na) metal and water ($H_2O$) reacting to produce similarly non-toxic and non-hazardous hydrogen ($H_2$) gas and sodium hydroxide (NaOH) byproduct the latter, which can be reclaimed and readily recycled by electrolysis to recover the sodium (Na) metal for reuse in generating hydrogen. Although other methods exist for storing hydrogen safely in solid form that are more efficient in terms of the weight of hydrogen stored in the chemical per unit weight and volume of the chemical than sodium (Na) metal, such as for example sodium borohydride ($NaBH_4$), the latter chemical is more difficult to produce and to recycle from its byproduct sodium borate ($NaBO_2$), resulting from the reaction of water ($H_2O$) and $NaBH_4$, in the very large quantities needed for widespread powering of commercial and passenger motor vehicles. By contrast, although sodium (Na) metal produces less hydrogen per unit weight and volume from its reaction with water ($H_2O$) than sodium borohydride ($NaBH_4$), the sodium hydroxide (NaOH) byproduct of the reaction of sodium (Na) metal and water ($H_2O$) can be more easily reprocessed in large scale by electrolysis than sodium borate ($NaBO_2$), to recover the sodium (Na) metal for reuse in generating hydrogen in the large quantities needed to support widespread application of hydrogen powered commercial and private motor vehicles.

BRIEF DESCRIPTION OF THE SEVERAL VIEWS OF THE DRAWING

These and other features of the subject of the invention will be better understood with connection with the Detailed Description of the Invention in conjunction with the Drawings, of which.

DETAILED DESCRIPTION OF THE INVENTION

Figure 1:
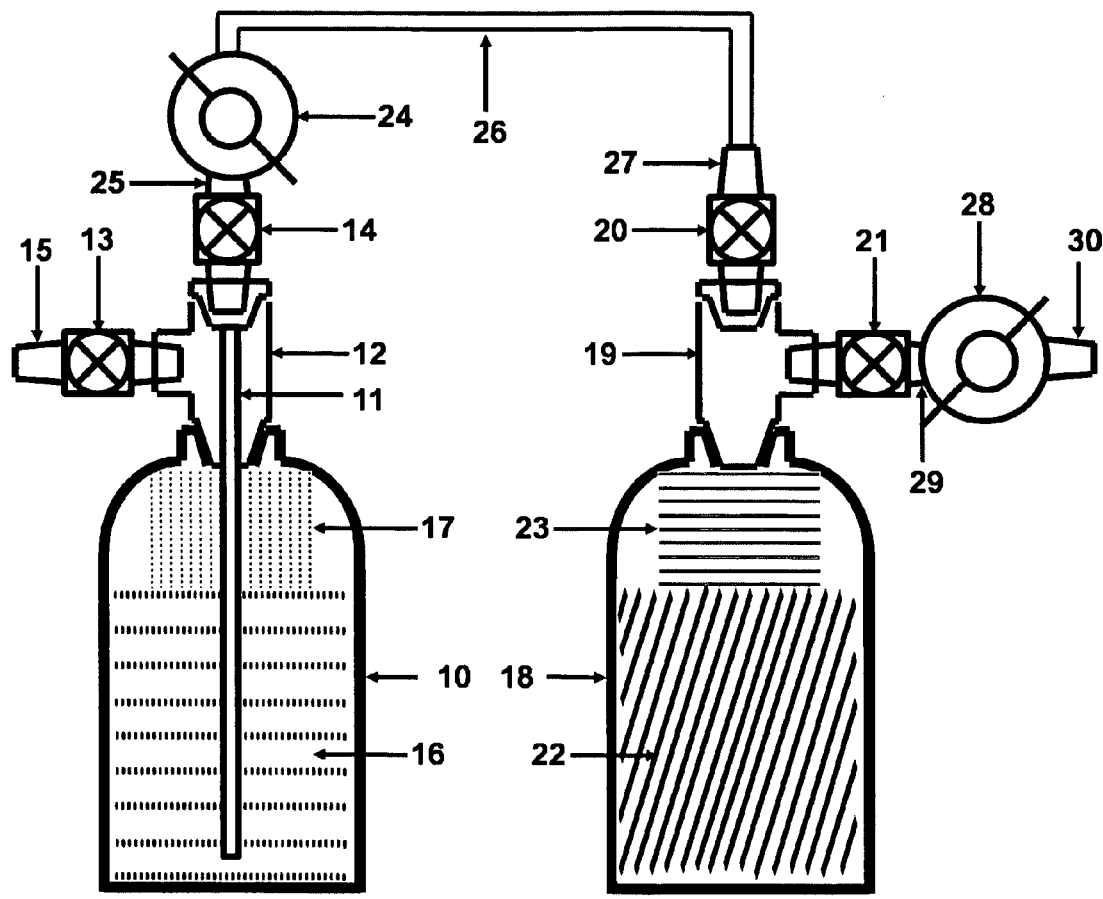
FIG. 1 illustrates the chemical-mechanical apparatus and method for storing and generating hydrogen ($H_2$) gas to power electricity generating fuel cells for commercial and private motor vehicle transport, using the chemical reaction between water ($H_2O$) in a liquid state and solid sodium (Na) metal that releases hydrogen ($H_2$) gas from the water and produces sodium hydroxide (NaOH) byproduct.

Referring to FIG. 1, a depiction is shown of the compact, chemical-mechanical apparatus having no electrical or electromechanical components, that enables hydrogen ($H_2$) gas to be generated safely, on-demand, at the time and point of use in small or large quantities, using the chemical reaction: $2Na+2H_2O \rightarrow 2NaOH+H_2$, resulting from water ($H_2O$) in a liquid state being added directly to solid sodium (Na) metal in a controlled manner to liberate hydrogen ($H_2$) gas from the water, with sodium hydroxide (NaOH) generated as a byproduct which can later be reclaimed and recycled in an environmentally clean manner by electrolysis according to the reaction: $2NaOH+2e^- \rightarrow 2Na+H_2O+1/2O_2$ and releasing only water ($H_2O$) vapor and oxygen ($O_2$) to the atmosphere, to recover the sodium (Na) metal for reuse in generating hydrogen, thereby forming a complete clean energy hydrogen power cycle, applicable for large scale commercial and private electric motor vehicle transportation. The apparatus of the present invention, in a preferred embodiment consists of a first stainless steel high pressure cylinder 10 consisting of a stainless steel riser tube 11, a street-T type stainless steel fitting 12, an inlet valve 13 and an outlet valve 14. The inlet valve 13 when opened, allows the cylinder 10 to be filled through the input port 15 with liquid water ($H_2O$) 16 followed by filling with an overpressure of inert nitrogen ($N_2$) gas 17 above the liquid water ($H_2O$) 16. During normal operation of the hydrogen generating system, when it is generating hydrogen ($H_2$) gas, the inlet valve 13 is closed and the outlet valve 14 is fully open. The second stainless steel high pressure cylinder 18 has a street-T stainless steel fitting 19, an inlet valve 20 and an outlet valve 21. The second stainless steel cylinder 18 is filled with a solid cast block of solid sodium (Na) metal 22 that conforms to the shape of the cylinder but does not fill it completely, leaving room near the top of the cylinder 18 for hydrogen ($H_2$) gas 23 to collect as it is generated from the reaction of liquid water ($H_2O$) 16 with the sodium (Na) metal 22. During normal operation of the hydrogen generating system, when it is generating hydrogen ($H_2$) gas 23, the inlet valve 20 is fully open, and the outlet valve 21 is also fully open.

To control the rate of hydrogen generation of the apparatus, a conventional mechanical pressure regulator 24 is connected to the output port 25 of the first stainless steel cylinder 10 and the output of the pressure regulator 24 is connected via a transfer line 26 to the input port 27 of the second stainless steel cylinder 18. A second conventional mechanical pressure regulator 28 is connected to the output port 29 of the second stainless steel cylinder 18 and the output of the second pressure regulator 30 is connected to the downstream application requiring hydrogen ($H_2$) gas. The first pressure regulator unit 24, controls the hydrogen ($H_2$) gas 23 pressure above the solid sodium (Na) metal 22, by allowing the water ($H_2O$) 16 in a liquid state to flow from the first stainless steel cylinder 10 into the second stainless steel cylinder 18 via the transfer line 26 and to react with the solid sodium (Na) metal 22 to produce hydrogen ($H_2$) gas 23 and sodium hydroxide (NaOH) byproduct, if the pressure of the hydrogen ($H_2$) gas 23 drops below the set point value of the mechanical pressure regulator unit 24. The second pressure regulator unit 28, controls the pressure at which the hydrogen ($H_2$) gas 23, is delivered through the output port 30 to the fuel cell input or other downstream application.

For the hydrogen generation apparatus of the present invention to properly generate hydrogen ($H_2$) gas 23 until the solid sodium (Na) metal 22 is fully consumed according to the chemical reaction: $2Na+2H_2O \rightarrow 2NaOH+H_2$, there must be sufficient water ($H_2O$) 16 in the first stainless steel cylinder 10 to react with all of the sodium (Na) metal 22 in the second stainless steel cylinder 18. Moreover, the inert nitrogen ($N_2$) gas 17 pressure above the liquid water ($H_2O$) 16 has to be sufficiently high to be able to force enough of the water up through the riser pipe 11 as the finite quantity of nitrogen ($N_2$) gas 17 expands to fill the first stainless steel cylinder 10, to fully consume all of the sodium (Na) metal 22 in the second stainless steel cylinder 18.

The liquid state of the water ($H_2O$) 16, must be maintained even at low temperatures such as might occur in cold weather environments and this goal can be achieved by dissolving a solute in the water ($H_2O$) 16 in the first stainless steel cylinder 10 such as ordinary sodium chloride (NaCl) salt which can depress the freezing point of the water to approximately −20° C. for a saturated solution or alternatively, sodium hydroxide (NaOH) can be dissolved in the liquid water ($H_2O$) 16 to achieve a similar goal of freezing point depression. It is more beneficial to use sodium hydroxide (NaOH) in the water ($H_2O$) 16 to achieve freezing point depression since sodium hydroxide (NaOH) byproduct is produced in the second stainless steel cylinder 18 when the water ($H_2O$) 16 reacts with the solid sodium (Na) metal 22 thereby ensuring that only relatively pure sodium hydroxide (NaOH) byproduct remains in the second stainless steel cylinder 18 after the sodium (Na) metal 22 is consumed.

As an added measure of safety, the valves 13, 14, 20 and 21 of the hydrogen generation apparatus must be of an all stainless steel, welded construction with metal to metal sealing to prevent any hydrogen ($H_2$) or nitrogen ($N_2$) gas leaks. The street-T fittings 12 and 19 can be connected to the stainless steel cylinders 10 and 18 respectively, using pipe thread connections however, these should be welded to minimize the possibility of nitrogen. ($N_2$) or hydrogen ($H_2$) gas leaks respectively. Normal thread sealing and valve packing materials such as polytetrafluoroethylene (PTFE) or polyetherether ketone (PEEK) should not be utilized in the hydrogen generation apparatus as sodium (Na) metal is reactive and could corrode these materials, ultimately causing failure in the sealing integrity of the apparatus. Although the sodium (Na) metal 22, remains in a solid state during normal operation of the hydrogen generation apparatus, PEEK and PTFE materials can also be more prone to leaking hydrogen ($H_2$) gas than welded seals.

Following the conversion of all of the solid sodium (Na) metal 22 to hydrogen ($H_2$) gas 23 and sodium hydroxide (NaOH) byproduct in the second stainless steel cylinder 18, the sodium hydroxide (NaOH) byproduct can be recovered from the second stainless steel cylinder 18. Initially, valve 13 is closed and valves 14, 20 and 21 are fully open as occurs during normal operation of the hydrogen generating apparatus. By first opening the inlet valve 13 of the first stainless steel cylinder 10, the apparatus is depressurized by venting all of the nitrogen ($N_2$) gas 17 from the apparatus. The water transfer line 26 is subsequently decoupled from the input port 27 of the second stainless steel cylinder 18. The highly water soluble sodium hydroxide (NaOH) byproduct can be subsequently flushed out with water from the second stainless steel cylinder 18, by opening the inlet valve 20, for reprocessing the sodium hydroxide (NaOH) back into sodium (Na) metal using electrolysis. The second stainless steel cylinder 18 can be dried out and refilled through the inlet valve 20 while keeping the outlet valve 21 closed, at the sodium hydroxide (NaOH) reprocessing plant, with a fresh charge of sodium (Na) metal 22, followed by closing of the inlet valve 20. The first stainless steel cylinder 10 can be refilled with water ($H_2O$) through the open inlet valve 13 while keeping the outlet valve 14 closed and repressurized with nitrogen ($N_2$) gas 17, followed by closing of the inlet valve 13. The transfer line 26 is then reconnected to the input port 27 of the second stainless steel cylinder 18 followed by opening of the outlet valve 14 of the first stainless steel cylinder 10 and opening of the inlet valve 20 of the second stainless steel cylinder 18. To begin generating and supplying hydrogen ($H_2$) gas 23 continuously to the electricity generating fuel cell or other downstream application, the outlet valve 21 of the second stainless steel cylinder 18 is opened fully. The hydrogen generating apparatus of the present invention can be installed in a rugged aluminum or stainless steel enclosure to shield the unit from damage such as might occur during motor vehicle collisions.

The apparatus of the present invention and shown in FIG. 1, also supports hydrogen storage and generation using lithium (Li) metal in place of sodium (Na) metal 22 and using argon (Ar) gas in place of nitrogen (N$_2$) gas 17 according to the chemical reaction: 2Li+2H$_2$O→2LiOH+H$_2$. The lithium hydroxide (LiOH) byproduct can be recovered and recycled by electrolysis in a similar manner to sodium hydroxide (NaOH) to recover the lithium (Li) metal for reuse in generating hydrogen, thereby forming a complete clean energy hydrogen power cycle, which unlike using sodium (Na) metal, is only appropriate for special applications since lithium (Li) metal is rarer and therefore more expensive than sodium (Na) metal. Moreover lithium (Li) metal burns in nitrogen (N$_2$) gas and therefore requires an argon (Ar) inert gas blanket which is more expensive than nitrogen (N$_2$) gas, rendering lithium (Li) metal use for hydrogen generation in the present invention unsuitable for large scale commercial and private electric motor vehicle transportation.

Figure 2:
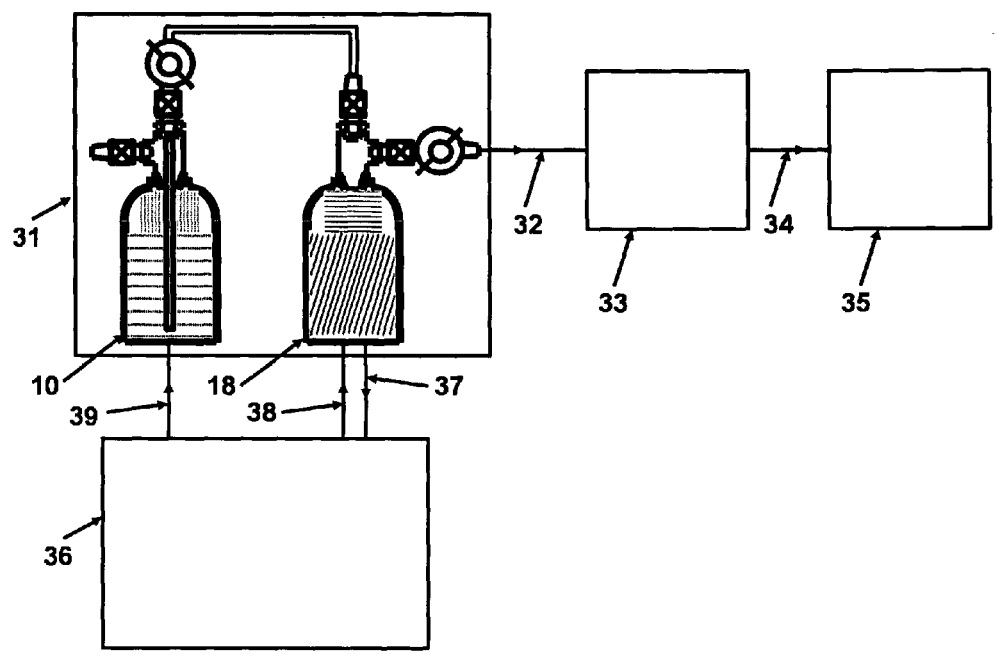
FIG. 2 illustrates the hydrogen fuel cycle enabled by using the method of storing and generating hydrogen ($H_2$) using solid sodium (Na) metal and its chemical reaction with water ($H_2O$) in a liquid state to produce hydrogen ($H_2$) gas and sodium hydroxide (NaOH) byproduct, the latter which can be reprocessed by electrolysis to recover the sodium metal (Na) for reuse in generating hydrogen, thereby forming a complete, environmentally clean hydrogen fuel cycle.

Referring to FIG. 2, a block diagram depiction of the environmentally clean hydrogen generation cycle is shown for electricity generating fuel cells used for large scale powering of electric motor vehicle transport. The hydrogen generation apparatus of the present invention 31 provides hydrogen (H$_2$) gas 32 to the electricity generating fuel cell 33 of an electric motor vehicle. The electricity from the fuel cell 33, is used to provide electric power 34 to the electric motor 35 of the commercial or private motor vehicle. After the sodium (Na) metal has been consumed in the second stainless steel cylinder 18 of the hydrogen generating apparatus 31 of the present invention, the hydrogen generation apparatus 31 can be mechanically decoupled from the fuel cell 33 and replaced with a new unit that has a full charge of sodium (Na) metal in the second stainless steel cylinder 18 and is ready to continue generating hydrogen (H$_2$) gas 32 for the fuel cell 33. The depleted hydrogen generation unit 31 is sent to a fuel recycling plant 36, where the sodium hydroxide (NaOH) byproduct is extracted or flushed out 37 from the second stainless steel cylinder 18 of the apparatus in order to recover the sodium (Na) metal, using electrolysis according to the reaction: 2NaOH+2e$^-$→2Na+H$_2$O+1/2O$_2$ and releasing only water (H$_2$O) vapor and oxygen (O$_2$) to the atmosphere, thereby forming a complete clean energy hydrogen power cycle, applicable for large scale commercial and private electric motor vehicle transportation. The energy for the electrolytic reprocessing operation at the fuel recycling plant 36, can be provided from a large hydroelectric power generating station or alternatively from nuclear power stations. At the sodium hydroxide (NaOH) recycling plant 36 the second stainless steel cylinder 18 of the hydrogen generating apparatus 31 of the present invention is refilled with sodium (Na) metal and the first stainless steel cylinder 10 is replenished 39 with liquid water (H$_2$O) with an inert nitrogen (N$_2$) gas overpressure and made ready to be reinstalled in a commercial or private electric motor vehicle for continued operation delivering hydrogen (H$_2$) gas 32 to the electricity generating fuel cell 33.

In summary, a novel apparatus, and method for implementing a compact, chemical-mechanical apparatus, having no electrical components, for storing and generating hydrogen safely, on-demand, at the time and point of use in small or large quantities using the environmentally clean chemical reaction between sodium (Na) metal and liquid water (H$_2$O) to generate hydrogen (H$_2$) gas and sodium hydroxide (NaOH) byproduct is presented, for powering electricity generating fuel cells for large scale commercial and private electric motor vehicle transport. The apparatus of the present invention supports hydrogen (H$_2$) gas generation by the controlled addition of liquid water (H$_2$O) to solid sodium (Na) metal to produce hydrogen (H$_2$) gas and sodium hydroxide (NaOH) using only mechanical components without electrical components that require external power and can generate sparks or short circuits, producing catastrophic failure in hydrogen storage and generation systems. The sodium hydroxide (NaOH) can be reclaimed and recycled by electrolysis using hydroelectric power to recover the sodium (Na) metal for reuse in generating hydrogen, thereby forming a complete clean energy hydrogen power cycle.

The invention claimed is:

1. A method for generation of hydrogen (H2) gas safely, on-demand, at the time and point of use in small or large quantities using the environmentally clean, exothermic chemical reaction between water (H2O) in a liquid state and sodium (Na) metal in a solid state to generate said hydrogen (H2) gas and sodium hydroxide (NaOH) byproduct, comprising the steps of:

storing said water (H2O) in a liquid state in a first cylinder with an overpressure of inert nitrogen (N2) gas above said water (H2O) in a liquid state stored in said first cylinder; and storing said sodium (Na) metal in a solid state in a second cylinder; and coupling the output port of said first cylinder to the inlet of a first mechanical gas pressure regulator, wherein the outlet of said first mechanical gas pressure regulator is coupled to the input port of said second cylinder storing said sodium (Na) metal in a solid state, for sensing and controlling the pressure of said hydrogen (H2) gas generated above said sodium (Na) metal in a solid state by transferring said water (H2O) in a liquid state from said first cylinder into said second cylinder storing said sodium (Na) metal in a solid state when said pressure of said hydrogen (H2) gas above said sodium (Na) metal in a solid state stored in said second cylinder drops below the set point pressure of said first mechanical gas pressure regulator; and coupling the output port of said second cylinder to the inlet of a second mechanical gas pressure regulator, wherein the outlet of said second mechanical gas pressure regulator is coupled to the electricity generating fuel cell or other downstream application requiring said hydrogen (H2) gas, for controlling the pressure at which said hydrogen (H2) gas is delivered to said electricity generating fuel cell or said other downstream application; and injecting said water (H2O) in a liquid state from said first cylinder into said second cylinder using said first mechanical gas pressure regulator, until all of said sodium (Na) metal in a solid state stored in said second cylinder has reacted with said water (H2O) in a liquid state from said first cylinder to generate said hydrogen (H2) gas and said sodium hydroxide (NaOH) byproduct in said second cylinder; and recovering said sodium hydroxide (NaOH) byproduct in said second cylinder after all of said sodium (Na) metal in a solid state stored in said second cylinder has reacted with said water (H2O) in a liquid state from said first cylinder to generate said hydrogen (H2) gas, for reprocessing said sodium hydroxide (NaOH) byproduct using electrolysis to recover said sodium (Na) metal in a solid state for reuse in said generation of said hydrogen (H2) gas.

2. A method according to claim 1 in which said first cylinder and said second cylinder comprise stainless steel.

3. A method according to claim 1 in which said first cylinder comprises a riser tube wherein said overpressure of inert nitrogen (N2) gas above said water (H2O) in a liquid state stored in said first cylinder expands to force said water (H2O)

in a liquid state upward through said riser tube and out through said output port of said first cylinder.

4. A method according to claim 1 in which said first cylinder comprises an inlet valve and an outlet valve wherein said inlet valve is closed during said generation of said hydrogen (H2) gas and wherein said outlet valve is open during said generation of said hydrogen (H2) gas.

5. A method according to claim 4 in which said inlet valve of said first cylinder is open during refueling of said first cylinder with said water (H2O) in a liquid state and said overpressure of inert nitrogen (N2) gas above said water (H2O) in a liquid state and wherein said outlet valve of said first cylinder is closed during said refueling of said first cylinder.

6. A method according to claim 1 in which said second cylinder comprises an inlet valve and an outlet valve wherein said inlet valve and said outlet valve are open during said generation of said hydrogen (H2) gas.

7. A method according to claim 6 in which said inlet valve of said second cylinder is open during refueling of said second cylinder with said sodium (Na) metal in a solid state and wherein said outlet valve of said second cylinder is closed during said refueling of said second cylinder.

8. A method according to claim 1 in which sodium chloride (NaCl) salt solute or sodium hydroxide (NaOH) solute is added to said water (H2O) in a liquid state stored in said first cylinder, for lowering the freezing point of said water (H2O) in a liquid state stored in said first cylinder to −20 degrees Celsius for a saturated solution of said sodium chloride (NaCl) salt solute, thereby allowing said generation of said hydrogen (H2) gas at said −20 degrees Celsius.

9. A method according to claim 1 in which said sodium hydroxide (NaOH) byproduct is reprocessed by said electrolysis using hydroelectric or nuclear power to recover said sodium (Na) metal in a solid state.

* * * * *